(12) United States Patent
Wan et al.

(10) Patent No.: US 12,170,814 B2
(45) Date of Patent: Dec. 17, 2024

(54) FEATURE AND PARAMETER EXTRACTION FOR AUDIO AND VIDEO PROCESSING

(71) Applicant: AVAGO TECHNOLOGIES INTERNATIONAL SALES PTE. LIMITED, Singapore (SG)

(72) Inventors: Wade Wan, Irvine, CA (US); Jason W. Herrick, San Jose, CA (US); Richard Hayden Wyman, San Jose, CA (US); Brett J. Andrews, Irvine, CA (US); Gheorghe Berbecel, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 289 days.

(21) Appl. No.: 17/513,518

(22) Filed: Oct. 28, 2021

(65) Prior Publication Data
US 2023/0133015 A1 May 4, 2023

(51) Int. Cl.
| | |
|---|---|
| H04N 21/44 | (2011.01) |
| G06N 20/00 | (2019.01) |
| H04N 19/14 | (2014.01) |
| H04N 19/517 | (2014.01) |
| H04N 21/439 | (2011.01) |

(52) U.S. Cl.
CPC ....... *H04N 21/44008* (2013.01); *G06N 20/00* (2019.01); *H04N 19/14* (2014.11); *H04N 19/517* (2014.11); *H04N 21/4394* (2013.01)

(58) Field of Classification Search
CPC ............ H04N 21/44008; H04N 19/14; H04N 19/517; H04N 21/4394; H04N 21/26603; H04N 21/8456; H04N 21/4627; G06N 20/00

USPC ........................................................ 386/241
See application file for complete search history.

(56) References Cited

U.S. PATENT DOCUMENTS

| | | | |
|---|---|---|---|
| 11,430,095 B2 * | 8/2022 | Kadu ....................... H04N 5/57 |
| 11,770,510 B2 * | 9/2023 | Sviridenko ........... G06T 11/203 |
| | | | 386/328 |
| 2020/0007931 A1 | 1/2020 | Ho et al. | |
| 2021/0150680 A1 | 5/2021 | Gadgil et al. | |

FOREIGN PATENT DOCUMENTS

WO  WO-2020/061172 A1  3/2020

OTHER PUBLICATIONS

Extended European Search Report on EP 22203324.3 dated Mar. 22, 2023.

* cited by examiner

*Primary Examiner* — Helen Shibru
(74) *Attorney, Agent, or Firm* — Foley & Lardner LLP (57) ABSTRACT

Methods, systems, and devices for improving security of media streams are disclosed. The system can receive a decoded media stream from a media decoding pipeline that receives and decodes an encoded media stream. The system can identify, based on the decoded media stream, a set of features to generate, and generate the set of features using the decoded media stream. Such features may include luma histograms, pixel intensity data, motion vectors, edge detection, audio gain, tonal information, pitch information, among other types of features. The system can provide the set of features to a processor executing a machine-learning model, wherein the processor executing the machine-learning model is prevented from accessing the decoded media stream by the device.

20 Claims, 4 Drawing Sheets

FEATURE AND PARAMETER EXTRACTION FOR AUDIO AND VIDEO PROCESSING

BACKGROUND

In digital video systems encoded bitstreams of media data are decoded by as part of media processing systems, such as a set top box or television processor, and subsequently output at an appropriate audio or video device. Processing information from these streams is challenging to perform in real-time or near real-time, because doing so would require processing of very large amounts of data. Similarly, providers of such content often require strict processing guidelines to be followed when processing such content to prevent the occurrence of unauthorized access or distribution of the content streams. These challenges make it impracticable to implement machine learning architectures in media processing pipelines, such as set top boxes or smart televisions, using conventional approaches.

SUMMARY

The systems and methods of the present disclosure solve these and other issues by providing techniques to extract features and parameters from decoded bitstreams in the media stream decoding pipeline. By generating these features within the media processing pipeline, the total amount of information that is provided to configurable machine-learning architectures is greatly reduced, which significantly improves the performance of these machine learning systems. Similarly, by providing the features to the configurable machine-learning, while preventing the configurable machine-learning from accessing the raw decoded media stream, the requirements imposed by content providers are satisfied while still allowing for configurable processing within the media processing pipeline.

At least one aspect of the present disclosure is directed to a method of improving security of media streams. The method may be performed, for example, by one or more processors of a device. The method can include receiving a decoded media stream from a media decoding pipeline that receives and decodes an encoded media stream. The method can include identifying, based on the decoded media stream, a set of features to generate. The method can include generating the set of features using the decoded media stream. The method can include providing the set of features to a processor executing a machine-learning model. The processor executing the machine-learning model is prevented from accessing the decoded media stream by the device.

In some implementations, the decoded media stream can include video data. In some implementations, the set of features can include a luma histogram of the video data. In some implementations, identifying the set of features can include determining a type of media in the decoded media stream. In some implementations, identifying the set of features can include identifying the set of features based on the type of media in the decoded media stream. In some implementations, identifying the set of features can include extracting raw video data from the decoded media stream. In some implementations, identifying the set of features can include identifying the set of features based on attributes of the raw video data.

In some implementations, generating the set of features can include pre-processing the decoded media stream. In some implementations, generating the set of features can include applying an edge detection technique or a spectral analysis technique to the decoded media stream. In some implementations, generating the set of features can include determining, based on one or more color channels of the decoded media stream, one or more of a minimum pixel intensity value, a maximum pixel intensity value, an average pixel intensity value, or a median pixel intensity value. In some implementations, generating the set of features can include detecting a motion vector in the decoded media stream. In some implementations, providing the set of features to the machine-learning model can include storing the set of features in a region of memory that is accessible by the processor executing the machine-learning model. In some implementations, the method can include generating an output media stream including a graphic generated based on an output of the machine learning processor and the decoded media stream. In some implementations, the method can include providing the output media stream for presentation at a display.

At least one other aspect of the present disclosure is directed to a system for improving security of media streams. The system can include one or more processors of a device. The system can receive a decoded media stream from a media decoding pipeline that receives and decodes an encoded media stream. The system can identify, based on the decoded media stream, a set of features to generate. The system can generate the set of features using the decoded media stream. The system can provide the set of features to a processor executing a machine-learning model. The processor executing the machine-learning model is prevented from accessing the decoded media stream by the device.

In some implementations, the decoded media stream can include video data. In some implementations, the set of features comprises a luma histogram of the video data. In some implementations, to identify the set of features, the system can determine a type of media in the decoded media stream. In some implementations, the system can identify the set of features based on the type of media in the decoded media stream. In some implementations, to identify the set of features, the system can extract raw video data from the decoded media stream. In some implementations, the system can identify the set of features based on attributes of the raw video data.

In some implementations, to generate the set of features, the system can pre-process the decoded media stream. In some implementations, to generate the set of features, the system can apply an edge detection technique or a spectral analysis technique to the decoded media stream. In some implementations, to generate the set of features, the system can determine, based on one or more color channels of the decoded media stream, one or more of a minimum pixel intensity value, a maximum pixel intensity value, an average pixel intensity value, or a median pixel intensity value. In some implementations, to generate the set of features, the system can detect a motion vector in the decoded media stream. In some implementations, to provide the set of features to the machine-learning model, the system can store the set of features in a region of memory that is accessible by the processor executing the machine-learning model.

At least one other aspect of the present disclosure is directed to a circuit for improving the security of media streams. The circuit can include a bitstream decoder that receives an encoded bitstream and generates a decoded media stream. The circuit can include a processing component that receives the decoded media stream from the bitstream decoder. The circuit can identify, based on the decoded media stream, a set of features to generate. The circuit can generate the set of features using the decoded media stream. The circuit can provide the set of features to a second processor executing a machine-learning model. The second processor executing the machine-learning model is prevented from accessing the decoded media stream.

In some implementations, the circuit can include the second processor executing the machine-learning model. In some implementations, the circuit is configured such that the second processor is unable to access the decoded media stream.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure. For purposes of clarity, not every component may be labeled in every drawing. In the drawings.

DETAILED DESCRIPTION

Below are detailed descriptions of various concepts related to, and implementations of, techniques, approaches, methods, apparatuses, and systems for improving security of media streams. The various concepts introduced above and discussed in greater detail below may be implemented in any of numerous ways, as the described concepts are not limited to any particular manner of implementation. Examples of specific implementations and applications are provided primarily for illustrative purposes.

Machine learning processors, particularly those that execute over media content such as video and audio, are useful in extracting insightful features from media streams. For example, machine learning techniques may be executed over media content to detect the presence of objects, identify themes or features, detect edges, or perform other types of insightful processing. There is a growing interest in executing such machine-learning models on end user devices that are used to display media content, such as set-top boxes. Such an arrangement would be useful for new modes, such as scene and object detection, tracking, and classification; identifying user preferences and generating predictions and recommendations, and audio or visual enhancement, among others.

One way to accomplish media process on set-top boxes or other devices that receive encoded media streams is to directly send audio and/or video data to a machine-learning processor, and execute the desired machine-learning algorithm on that machine-learning processor over the raw audio and/or video data. However, this approach presents several problems. First, the amount of data, especially when considering high-resolution video data, is very large and prohibitive to redirect from a decoder to a separate processor (e.g., a soft-processor, or separate chip, etc.). For example, high-dynamic range video with a 4K (3840×2160) resolution at sixty (60) frames per second results in a bitrate of approximately 14.9 Gbps. This amount of data is challenging for machine-learning processors to access and process directly in real-time.

In addition, content providers are protective of audio/video data that is transmitted to set-top boxes or similar streaming devices. Generally, set-top boxes are configured to securely protect this data and not allow it to be accessed by other external processing components. For example, SVP (Secure Video Processing) requirements strictly prohibit the video/audio bitstream or the decoded raw pixels to be accessible by other non-secure processing components, because doing so presents a significant security risk for the video and/or audio data. These security concerns present themselves both at the interface used to transfer the data by copying to a processor-accessible memory, as well within the machine-learning processor itself (e.g., being programmed to just redirect/copy out the signal). Thus, any data that could be used to reconstruct the source media stream would be blocked in accordance with these requirements.

Although some approaches may perform some downsampling or downscaling techniques to reduce the size of bitstreams, these solutions are inadequate both for machine-learning processors and the security requirements of media processing systems. For example, such approaches may use large source buffers (e.g., 4K HDR video at sixty frames-per-second) and convert HDR (10-bit) to SDR (8-bit), while downscaling the resolution of the video to predetermined dimensions, (e.g., 512×512, etc.), and producing a standard RGB pixel format commonly used by existing machine-learning models. However, even using such techniques, the resulting media stream is impracticable (e.g., 512×512 pixels*3 components/pixel*8 bits/component*60 frames/sec=377 Mbps bit rate) for most machine-learning models in end-user devices. Further, the security vulnerabilities are still present, as direct pixel data is still exposed to external components. Even reduced resolution versions of media streams may be in violation of secure protocols implemented by such devices. The data must be further protected or at least obfuscated from direct access in order to be in compliance; however doing so would also make conventional machine-learning processes impossible.

The systems and methods of the present disclosure solve these and other issues by implementing additional feature extraction processing in the media decoding pipeline. The generated features are in a format that does not need to be SVP protected (e.g., cannot be used to reconstruct the media stream), allowing it to be used by non-secure operations. To do so, the feature extraction techniques can compute or otherwise generate new types of data from the original media stream that allows other processors, such as machine-learning processors, to run additional processing algorithms with a minimal amount of processing. This improves both the security of the media stream (e.g., by being in compliance with SVP requirements), as well as improves the overall performance of the system. By extracting only the features that are useful to machine-learning algorithms from the raw media data, the amount of information to be processed by the machine-learning algorithms is significantly reduced without harming overall algorithm efficacy. The performance of such algorithms is improved not only due to the reduction in data size, but also because the data is native to the algorithm and therefore requires less complexity and pre-processing steps.

The systems and methods described herein implement a hardware component (e.g., a hardware block in a programmable processor such as a field-programmable gate array or other programmable logic, etc.) after the media decoders in the media processing pipeline, which directly receives the decoded media content and generates features and parameters that are compatible with machine-learning processors. Some examples of such features can include a luma histogram generated from raw video content, edge detection techniques, spectral analysis, motion vectors, or pixel parameters, among others. Similarly, for audio content, frequency bands, histograms, peaks, and other audio analysis (e.g., tonal, pitch, or harmonic analysis, etc.) may be implemented. These features cannot be used to "recreate" the media stream, and therefore does not require SVP protection. Likewise, the generated features are significantly smaller than the original pixel data, and may be used to target and simplify specific machine-learning algorithms or other useful processing algorithms. For example, the input data to machine-learning models, such as neural networks, are generally specified and predetermined, and therefore the features may be generated or customized to a desired machine-learning model or machine-learning framework. These and other improvements are described in further detail herein.

Figure 1:
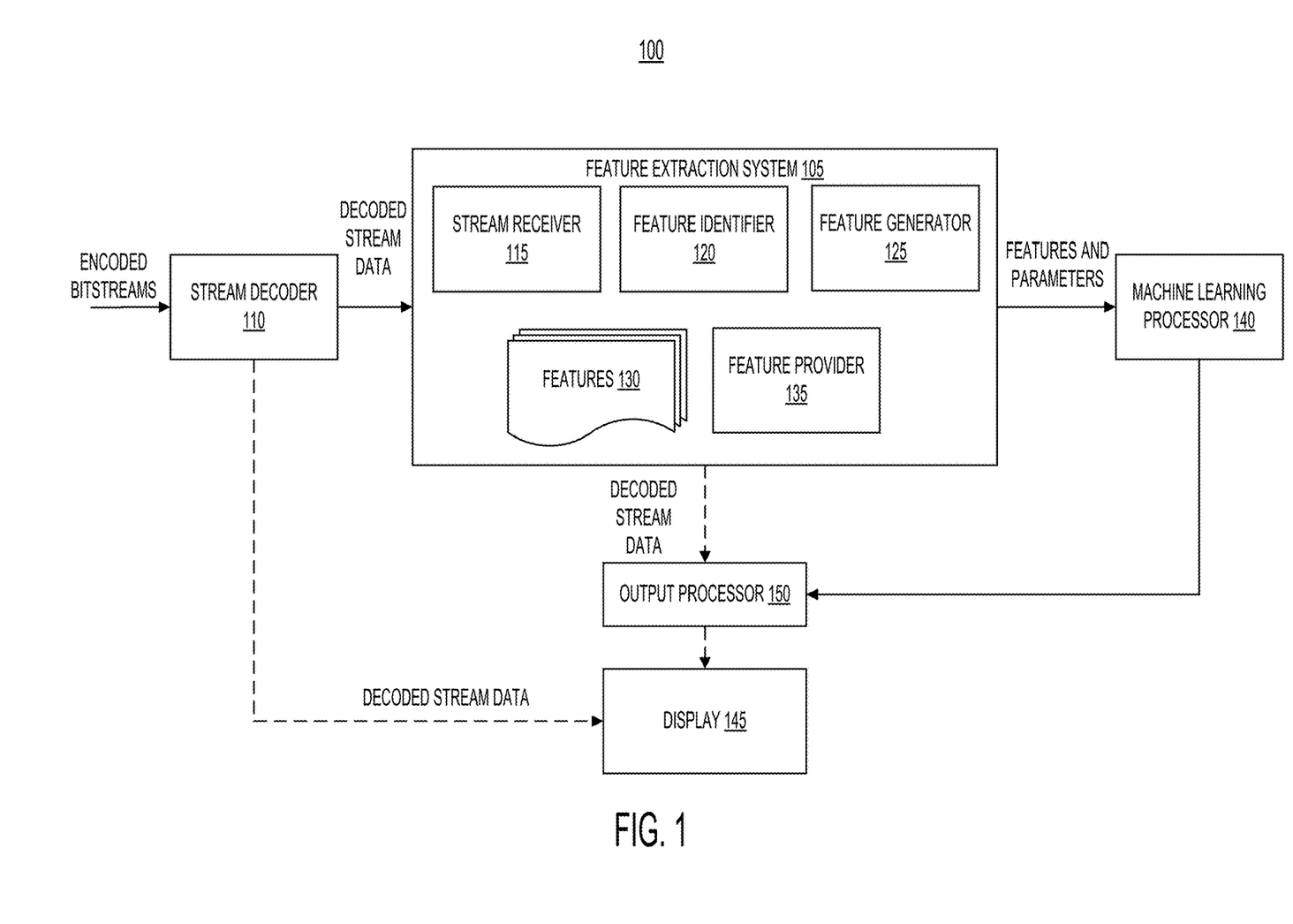
FIG. 1 illustrates a block diagram of an example system for improving security of media streams, in accordance with one or more implementations.

Referring now to FIG. 1, illustrated is a block diagram of an example system 100 for improving security of media streams, in accordance with one or more implementations. The system 100 can include at least one feature extraction system 105, at least one stream decoder 110, at least one machine-learning processor, at least one display 145, and in some implementations at least one output processor 150. The feature extraction system 105 can include at least one stream receiver 115, at least one feature identifier 120, at least one feature generator 125, one or more features 130 (e.g., stored in a region of memory at the feature extraction system 105), and at least one feature provider 135.

Each of the components (e.g., the feature extraction system 105, the stream decoder 110, the machine-learning processor 140, etc.) of the system 100 can be implemented using the hardware components or a combination of software with the hardware components of a computing system (e.g., computing system 400 described in connection with FIGS. 4A and 4B, etc.). In some implementations, the stream decoder 110 and the feature extraction system 105 may be hardware components defined in a configurable logic processor, such as a field-programmable gate array (FPGA) or an application-specific integrated circuit (ASIC). In some implementations, the machine-learning processor 140 may also be part of the same configurable logic processor. In some implementations, the stream decoder 110, the feature extraction system 105, and the machine learning processor 140 may be separate hardware or software components. Each of the components (e.g., the stream receiver 115, the feature identifier 120, the feature generator 125, the one or more features 130, and the feature provider 135) the of the feature extraction system 105 may be implemented in software, hardware, or any combination of software or hardware, and can perform the functionalities detailed herein.

The feature extraction system 105 can include at least one processor and a memory, e.g., a processing circuit. The memory can store processor-executable instructions that, when executed by processor, cause the processor to perform one or more of the operations described herein. The processor may include a microprocessor, an ASIC, an FPGA, programmable logic circuits, or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The feature extraction system 105 can include one or more computing devices or components. The feature extraction system 105 can include any or all of the components and perform any or all of the functions of the computer system 400 described in connection with FIGS. 4A and 4B. The feature extraction system 105 may communicate with the other components of the system 100 using one or more communications interfaces (not pictured). The communications interface can be or include any type of wired or wireless communication system, including suitable computer or logical interfaces or busses, for conducting data communications.

The memory of the feature extraction system 105 can be any suitable computer memory that stores or maintain any of the information described in connection with the present techniques. The memory may store one or more data structures, which may contain, index, or otherwise store each of the values, pluralities, sets, variables, vectors, or thresholds described herein. The memory can be accessed using one or more memory addresses, index values, or identifiers of any item, structure, or region maintained in the memory. The memory can be accessed and modified by the components of the feature extraction system 105. In some implementations, the memory can be internal to the feature extraction system 105. In some implementations, the memory can exist external to the feature extraction system 105, and may be accessed via an appropriate communications interface (e.g., a communication bus, etc.). In some implementations, the memory may be distributed across many different computer systems or storage elements, and may be accessed via a network or a suitable computer bus interface. The feature extraction system 105 can store, in one or more regions of the memory of the feature extraction system 105, the results of any or all computations, determinations, selections, identifications, generations, constructions, or calculations in one or more data structures indexed or identified with appropriate values.

The memory may store the features 130, which are generated by the components of the feature extraction system 105. The memory may be provided such that portions of the memory are accessible to only certain components of the system 100, either by way of physical connection or by software configuration. For example, the region of memory in which the features 130 are stored may be accessible and modifiable (e.g., read and write access) by the components of the feature extraction system 105. However, the machine learning processor 140 may only access regions of the memory that contain the features 130, and is prevented from accessing (e.g., by permissions, or from a lack of hardware connection) regions of the memory of the feature extraction system 105 that contain any other data. This prevents the machine learning processor 140 from accessing any information that may be subject to SVP requirements, while still allowing the machine learning processor 140 to access features and parameters generated from the decoded media stream, for example, in real-time or near real-time. In some implementations, the features 130 are stored in a region of memory of the machine-learning processor 140. For example, the feature extraction system 105 (and the components thereof) may have write access to one or more memory components of the machine learning processor 140, while the machine learning processor 140 can only access its own memory. Using the techniques described herein, the feature extraction system 105 may generate features from decoded media streams and write the features 130 to the memory of the machine learning processor 140.

The features 130 can include any type of features that are derivable from a media stream (e.g., audio and/or video data, etc.), but that may not be used to fully reconstruct the media stream. Some non-limiting examples of the features 130 may include a luma histogram, edge detection plots (e.g., a matrix or data structure indicating locations of edges in video data, etc.), a spectral analysis information (e.g., one or more data structures that indicate spectral bands of one or more pixels in video data, etc.), motion vectors (e.g., locations, directions, and magnitudes of movement detected in video data, etc.), as well as various parameters, such as minimum pixel value (e.g., minimum intensity for one or more color channels across pixels in video data, etc.), maximum pixel value (e.g., minimum intensity for one or more color channels across pixels in video data, etc.), average pixel value (e.g., the average intensity of a pixel across one or more color channels, etc.), as well as information related to audio in the media stream (e.g., gain information, frequency bands, histograms for various parameters of the audio stream, peak information, tone information, pitch information, harmonic analysis information, etc.). The features 130 may be formatted into one or more data structures by the components of the feature extraction system 105 to conform to one or more inputs of models or algorithms executing at the machine learning processor 140. In some implementations, a configuration setting may be stored at or provided to the feature extraction system 105 that specifies the type and format of features that should be generated from decoded media streams, as described herein.

In some implementations, the feature extraction system 105 may generate one or more features 130 using the techniques described herein in an offline process (e.g., after the decoded media stream has been provided for display). In such implementations, the feature extraction system 105 may store one or more portions of the decoded media streams provided by the stream decoder 110 to perform the feature extraction techniques described herein at a later time. In some implementations, one or more of the features 130 may be extracted from a media stream by an external computing system (not pictured), using a static or offline process similar to the feature generation techniques described herein. The features 130 can then be provided to the feature extraction system 105 for use in the operations described herein. For example, in one such implementation, the feature extraction may be performed prior to providing the encoded media stream to a device for display. In some such implementations, the data structure or structures comprising the features 130 may be provided to the device for analysis during decoding and display of the content. In other such implementations, the analysis may also be performed prior to providing the encoded media stream to a device for display, and the results of the analysis (e.g. object recognition, facial recognition, etc.) may be provided to the device or another device for display along with the decoding and display of the content.

The machine learning processor 140 may include at least one processor and a memory (e.g., a processing circuit), and may be defined as part of a configurable logic fabric that defines other components of the system 100. The memory can store processor-executable instructions that, when executed by processor, cause the processor to perform one or more of the operations described herein. The processor may include a microprocessor, an ASIC, an FPGA, programmable logic circuits, or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, ROM), RAM, EEPROM, EPROM, flash memory, optical media, or any other suitable memory from which the processor can read instructions. The instructions may include code from any suitable computer programming language. The machine learning processor 140 can include one or more computing devices or components. The machine learning processor 140 may include any or all of the components and perform any or all of the functions of the computer system 400 described in connection with FIGS. 4A and 4B. The machine learning processor 140 may communicate with the other components of the system 100 using one or more communications interfaces (not pictured). The communications interface can be or include any type of wired or wireless communication system, including suitable computer or logical interfaces or busses, for conducting data communications.

The machine learning processor 140 may be a hardware processor, a software component, or a processor defined in configurable logic, which implements one or more processing algorithms on the features 130. The machine learning processor 140 may be able to execute any type of algorithm that is compatible with the features 130, which may include artificial intelligence models such as linear regression models, logistic regression models, decision tree models, support vector machine (SVM) models, naïve Bayes models, k-nearest neighbor models, k-means models, random forest models, dimensionality reduction models, fully connected neural network models, recurrent neural network (RNN) models (e.g., long-short term memory (LSTM), independent RNNs, recursive RNNs, etc.), convolutional neural network (CNN) models, clustering algorithms, or unsupervised learning techniques, among others. The machine learning processor 140 may execute other types of algorithms over the features 130. The machine learning processor 140 may be configurable via programmable computer-readable instructions, which may be provided to the machine learning processor 140 via one or more suitable communications interfaces. The machine learning processor 140 may access portions of the memory of the feature extraction system 105, for example, the regions of memory that store any extracted or generated features 130.

In some implementations, the machine learning processor 140 may include its own memory that stores the features 130, which are written to the memory of the machine learning processor 140 by the feature extraction system 105 via a suitable communications interface. The machine learning processor 140 is prevented from accessing the decoded media streams provided by the stream decoder 110, for example, by a lack of permissions to access regions of memory that store the decoded media streams, or by a lack of a hardware connection to memory components that store the decoded media streams. In effect, this prevents the machine learning processor 140 from accessing any information that is subject to SVP protocols, thereby improving the security of the system. However, the machine learning processor 140 can still access regions of memory that store the features 130, which are not subject to SVP requirements because the features 130 cannot be used to fully reconstruct the decoded media streams.

In some implementations, the machine learning processor 140 may provide outputs that affect the display of the decoded media stream provided for display. The machine learning processor 140 can provide such outputs to the output processor 150, which may be a software or a hardware module that is part of the media processing pipeline, and therefore "trusted" (e.g., in compliance with SVP protocols) to access the decoded media stream. The output processor 150 may process individual pixels or groups of pixels of the decoded media stream before providing a final output to the display 145. Some examples of the output processing performed by the output processor 150 include, but are not limited to, filtering techniques (e.g., smoothing, sharpening, etc.), upscaling (e.g., from a lower resolution to a higher resolution), or color modification operations that modify the colors of one or more pixels in the decoded output stream. Additionally, one or more graphical elements, such as bounding boxes, labels for characters identified in the media stream, text-based translations of audio in the decoded media stream, or other graphical content can be generated by the output processor 150 and displayed with the decoded media stream. These operations may be performed as a function of the outputs of the machine learning processor 140.

The output processor 150 can generate a final media stream that includes modified pixels of the decoded media stream, and any generated graphics at determined locations and sizes, and provide the final stream to the display 145 for presentation. In some implementations, the feature extraction system 105 may bypass the output processor 150 and provide the decoded media stream to the display 145 for presentation without performing additional processing. The output processor 150 may also provide the output streams to other devices (not pictured) for output. For example, the output processor may transmit the decoded and modified media stream to a mobile device or another computing device via one or more suitable computer communication interfaces.

The stream decoder 110 can receive encoded bitstreams, for example, from a suitable computer communications interface. For example, the encoded bitstream may be encoded by a subscription content provider, such as a cable provider, which the stream decoder 110 can decode to generate a decode media stream (e.g., raw video or audio content). The stream decoder may include one or more frame buffers. The stream decoder 110 can decode compressed or otherwise encoded bitstreams received from a content provider system or network (not pictured). The decoded media content can take the form of one or more decoded video frames. Frame buffers, or other memory components of the stream decoder 110 or the feature extraction system 105, may store the decoded frames and any audio channels or audio content decoded from the encoded bitstreams. The stream decoder 110 may include any number of decoder components or frame buffer components, and may simultaneously or concurrently decode multiple encoded bitstreams to generate multiple decoded media streams (each of which may be processed by the feature extraction system 105). The stream decoder 110 can include one or more hardware video decoders, which may perform decoding operations and subsequently provide resulting decoded frames (and any decoded audio data) to the feature extraction system 105. The stream decoder 110 may include additional buffers (e.g., input buffers for storing compressed or encoded bitstreams before they are decoded by the by the stream decoder 110), network interfaces, controllers, memory, input and output devices, conditional access components, and other components for audio, video, or data processing.

The stream decoder 110 can obtain one or more encoded bitstreams from a source of encoded content. The source can be a content provider, a service provider, a headend, a video camera, a storage device, a computing system, or any other system capable of providing an encoded bitstream of video, audio, or data content. For example, the encoded bitstreams can include video content (e.g., a program, a channel, etc.). The video content may be encoded to have one or more predetermined resolutions (e.g., 2160p resolution vs. 1080p resolution), frame rates (e.g., 60 frames-per-second vs. 30 frames-per-second), bit precisions (e.g., 10 bits vs. 8 bits), or other video characteristics. The encoded bitstreams can be received via a cable network, a satellite, an internet, a cellular network, or other networks. For example, the cable network can run over coaxial cable, Bayonet Neill-Concelman (BNC) cable, Ethernet cable (such as Category 5,5e, 6, and 7 wire), fiber optic cable or other high data transfer technologies. The cable network may be connected to a local or remote satellite dish.

The stream decoder 110 can generate decoded content streams from one or more received encoded bitstreams. The stream decoder 110 then provides the decoded content to the feature extraction system 105. In some implementations, the stream decoder 110 may provide the decoded content streams to the display 145, which may be any type of display device. In some implementations, the stream decoder 110 can generate additional video streams with different characteristics from the received encoded bitstream. For instance, the stream decoder 110 may include a transcoder that generates decoded content streams at a variety of resolutions. Such resolutions can include, for example, a 4K Ultra High Definition (UHD) (e.g., 3,840×2,160 pixels or 2160p) resolution. The stream decoder 110 receive an encoded bitstream of 4K/2160p content as input, decode it, and generate a lower resolution (e.g., 1080p, 720p, etc.) content stream. Similar operations may be performed to reduce the bitrate of audio data. In another example, the stream decoder 110 can generate content streams with other characteristics (e.g., frame rate, bit precision, bit rate, chroma subsampling). The stream decoder 110 may provide one or more of the generated (e.g., decoded) content streams to the feature extraction system 105. The stream decoder 110 may be, may include, or may be part of a media decoding pipeline.

The display 145 can be any type of display device capable of displaying decoded content streams generated by the stream decoder 110. Some non-limiting examples of types of the display 145 include a television, a computer monitor, a mobile computer display, a projector, a tablet display, or a hand-held user device (e.g., smart phone) display, among others. In some implementations, the decoded content stream received by the feature extraction system 105 may be forwarded or otherwise provided to the display by the feature extraction system 105. In some implementations, the display 145 may receive and present the decoded content from the stream decoder 110. The display 145 may include speakers or other types of audio output devices to output audio data in decoded media streams, as well as a video display to present video data in decoded media streams.

Referring now to the operations of the feature extraction system 105, the stream receiver 115 can receive a decoded media stream from a media that receives and decodes an encoded media stream (e.g., the encoded bitstreams). The decoded media stream may include video data, audio data, metadata, or any combination thereof. The stream receiver 115 may receive the decoded content from the stream decoder 110 via one or more suitable communications interfaces. The stream receiver 115 may include one or more buffers, or regions of memory, that store the decoded content for processing by other components of the feature extraction system 105. The buffers, which may store timestamped frames and audio data received from the stream decoder 110, may be accessible by other components of the feature extraction system 105, but are inaccessible to the machine learning processor 140, in compliance with SVP requirements. In some implementations, the stream receiver 115 may provide the decoded media content to the display 145. The stream receiver 115 may store the received decoded content streams in association with various parameters and metadata that correspond to the decoded content stream (e.g., timestamp information, duration, resolution, bitrate, decoding rate, etc.). This information may be used by other components of the feature extraction system 105 to perform one or more of the operations described herein. This information may also be used by the display 145 to properly render or display the decoded media content.

Once the decoded media content has been received by the stream receiver 115, the feature identifier 120 can identify a set of features 130 to generate based on the decoded media stream. For example, the feature identifier 120 can identify the features 130 to generate based on the type of content in the decoded media stream. If the decoded media stream includes video content, the feature identifier 120 may identify features 130 corresponding to video data that should be generated. Similarly, if the decoded media stream includes audio content, the feature identifier 120 can identify features 130 corresponding to audio data that should be generated. The features 130 to be generated may also be identified based on a configuration setting (e.g., in a configuration file or setting provided via an external computing system or configured by a user). The configuration setting may specify one or more features 130 to generate for various types of media content. In some implementations, the feature identifier 120 may identify the specific media content in the decoded media content (e.g., the specific program, the specific channel, specific song, specific record etc.), and identify the features 130 to generate (e.g., from the configuration) using the identifier of the media content. For example, some configurations may perform different operations for different media programs that have different attributes (e.g., motion vectors may be generated for sporting events, while color and audio analysis may be performed for dramatic television shows). Attributes of media content can include various parameters of the decoded media stream, including a name of the media stream, a type of the media stream (e.g., video, audio, etc.), and the subject matter of the media stream, among any other attributes of the media stream.

Stored or accessed configuration settings may specify various types of features 130 that are to be extracted for certain media content. In some implementations, the feature identifier 120 may query, or transmit a request to, the machine learning processor 140, which may include the configuration settings for features 130 to identify, including one or more formatting requirements for the media content once generated. The machine learning processor 140 may include a program or another type of user-configurable setting that specifies one or more features 130 to generate. The feature identifier 120 can query the machine learning processor 140 for these features 130, and store the identifiers of the features 130 to generate in the memory of the feature extraction system 105, for use by other components in performing the present techniques.

The feature identifier 120 may identify different features 130 to generate from video content and audio content. For example, for video data, the feature identifier 120 may identify the types of features 130 to generate as including one or more of a luma histogram, edge detection plots, object detection information (e.g., the presence of one or more objects in a video frame), object classification information (e.g., the classification of one or more objects in a video frame), spectral analysis information, motion vectors, as well as various parameters, such as minimum pixel value, maximum pixel value, or average pixel value. The parameters may also include parameters or properties of the video content, including resolution, bitrate, among other information. The features 130 to generate for audio content may be identified as including, for example, gain information, frequency band histograms, other histograms for various parameters of the audio content, peak information (e.g., minimum, maximum, range values, etc.), tone information, pitch information, harmonic analysis information, a key of a song, or beats-per-minute in a song, among other audio features. The identified features 130 to generate using the decoded media content may be provided to the feature generator 125, which may then generate the identified features 130 to generate using the decoded media stream.

Once the features 130 to generate have been identified, the feature generator 125 can generate the set of features 130 identified by the feature identifier 120 using the decoded media stream. To do so, the feature generator 125 can execute one or more processing algorithms over the decoded media stream (e.g., over one or more of the buffers that store the decoded media content). For example, to generate one or more edge detection plots, the feature generator 125 may apply an edge detection technique to one or more frames of the decoded media content. Some example edge detection techniques include, but are not limited to, Canny edge detection, Deriche edge detection, differential edge detection, Sobel edge detection, Prewitt edge detection, and Roberts cross edge detection, among others. In some implementations, the feature generator 125 can pre-process (e.g., normalization, color adjustments, noise reduction, etc.) the decoded media content prior to performing the processing algorithms to generate the features 130. Other algorithms may also be executed to generate additional information. For example, object detection models (e.g., neural networks, etc.) may be executed over the frames of video content to detect the presence of one or more objects. In some implementations, a number of objects (which may be detected as having a particular class or type) may be detected in one or more frames of the video information using such object detection models.

Object detection models may be executed using the pixels of the frames as input, for example, in a feed-forward neural network or similar artificial intelligence model. Similarly, object classifications may be executed over frames (or portions of frames) to classify detected objects. Object classification models can include, for example, CNNs, fully connected neural networks, or other similar artificial intelligence models that can be used to generate classifications of objects. The feature generator 125 may generate spectral analysis on frames of video information, for example, by applying one or more spectral analysis algorithms to the pixels of the frames. Performing spectral analysis on color channel values on pixels in frames of the video data can include performing a Fourier transform, or a fast Fourier transform, over one or more color channels of a frame. The resulting spectral image may indicate spectral information of the colors in the image, but may deliberately be modified or incomplete in order to prevent it being used to reconstruct the frame itself.

In addition, the feature generator 125 may execute various algorithms over sequences of frames in video data, for example, to produce features 130 of the media content that correspond to time. For example, the feature generator 125 can generate the features 130 to include motion vectors of various pixels or objects detected in media content, by performing one or more motion estimation algorithms over the pixels of sequences of frames of the decoded media content. Some examples of motion estimation algorithms include block-matching algorithms, phase correlation and frequency domain analysis algorithms, pixel recursive algorithms, and optical flow algorithms. In some implementations, the feature generator 125 may generate motion vectors by performing corner detection on each frame in a sequence, and subsequently comparing locations of the corners over time (e.g., between frames) using statistics functions such as random sample consensus (RANSAC) to estimate motion vectors.

The features 130 to generate for audio content may be identified as including, for example, gain information, frequency band histograms, other histograms for various parameters of the audio content, peak information (e.g., minimum, maximum, range values, etc.), tone information, pitch information, harmonic analysis information, a key of a song, or beats-per-minute in a song, among other audio features. The feature generator 125 can also generate the features to include various color parameters of frames in the video stream. For example, the feature generator 125 can determine a minimum or maximum pixel intensity value of a frame by comparing the color channel intensity values of each pixel in the frame to one another. Similarly, the feature generator 125 can calculate an average pixel intensity value by summing the color intensity values of each pixel and dividing the sum by the total number of pixels. The feature generator 125 can determine a median pixel intensity value by ranking the pixels by intensity value, and subsequently determining the median of the pixels according to the intensity. These operations may be performed for a single color channel, or for combinations of color channels. For example, the feature generator 125 may generate a parameter for a maximum pixel intensity value for the "red" color channel, or for a combination of the "red" and "blue" color channels. These parameters may be stored as part of the features 130 by the feature generator 125.

The feature generator 125 can also generate features for audio content in a content stream (e.g., an audio channel that is synchronized to video content, or one or more audio channels for stereo or surround sound, etc.). Some example features 130 that may be generated from audio data can include, for example, gain information, tone information, pitch information, beat information (e.g., using one or more beat detection algorithms), frequency band histograms (e.g., calculated by performing a Fourier transform or an FFT algorithm over the audio signal, volume information, peak information (e.g., minimum audio signal value, maximum audio signal value, peak-to-peak difference, etc.), pitch information (e.g., by performing one or more pitch detection algorithms), a key of an audio sample (e.g., using a key finding algorithm), or the beats-per-minute of an audio sample (e.g., using a beat detection algorithm). The feature generator 125 may generate the features to conform to a format corresponding to the machine learning processor 140. As described herein above, the feature identifier 120 may query the machine learning processor 140, or another configuration setting, to identify the format in which the features 130 should be generated. The feature generator 125 can receive this formatting information, which may specify the structure and content of the data structures that make up the features 130, and generate the features 130 using the techniques described herein to conform to the appropriate structure. In this way, the feature generator 125 can generate the features 130 to be compatible with a variety of customizable machine learning models or processes. The feature generator 125 may store the generated features in the appropriate data structures in the memory of the feature extraction system 105.

The feature provider 135 can provide the set of features 130 generated by the feature generator 125 to the machine learning processor 140. For example, the feature provider 135 may communicate the one or more features to the machine learning processor 140 as they are generated, or in a batch process once a predetermined amount of features 130 are generated. The feature provider 135 may communicate the features 130 to the machine learning processor via a suitable communications interface. In some implementations, the feature provider 135 can communicate the features to the machine learning processor 140 by storing the set of features 130 in a region of memory that is accessible by the machine learning processor 140. For example, the machine learning processor 140 may include one or more memory components. To provide the features 130 to the machine learning processor, the feature provider 135 can write the features 130 to the memory of the machine learning processor 140, which can subsequently use the features when executing a machine learning model.

Machine learning models executed by the machine learning processor 140 can be any type of machine learning model, for example, facial detection or object detection models. Other processes may also be executed at the machine learning processor 140 using the features 130, such as fingerprinting of content, or content recommendation. For example, the machine learning processor 140 may execute one or more algorithms or machine learning models that can output content recommendations based on features 130 of content that a user views over time. The machine learning processor 140 may be in communication with one or more other external computing devices (not pictured) via a network (also not pictured). The machine learning processor 140 can communicate the outputs of the machine learning models or other algorithms to the external computing devices via the network.

Figure 2:
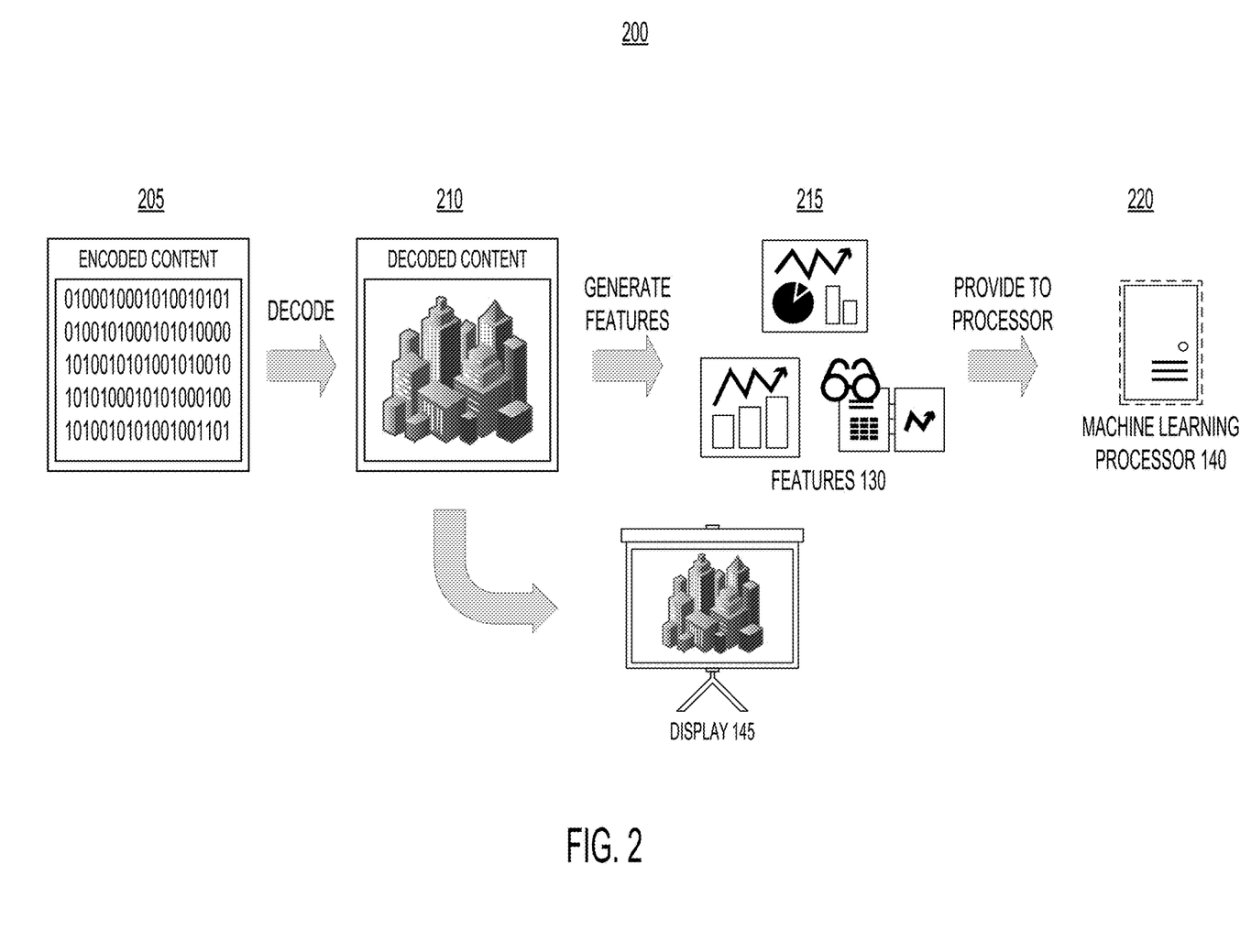
FIG. 2 illustrates an example data flow diagram of techniques for generating features from media streams, in accordance with one or more implementations.

Referring briefly now to FIG. 2, illustrated is an example data flow diagram 200 of techniques for generating features from media streams, in accordance with one or more implementations. As shown at stage 205 the encoded content is provided, and is otherwise undecipherable to most computing devices and circuits, except for particular stream decoders (e.g., the stream decoder 110) that are configured to decode the encoded content. The encoded content is then decoded into decoded content at stage 210. The decoded content may be raw video or audio information, and may include metadata indicating properties or attributes of the video or audio information. The decoded content may be provided for display at a display device 145. At stage 215, the decoded content is processed using the techniques described herein to create the features 130, which may be provided to the machine learning processor 140. Finally, at stage 220, the machine learning processor 140 executes one or more machine learning algorithms to generate insights related to the media content. As shown, the machine learning processor 140 does not access the decoded content, and is prevented from accessing this content in compliance with SVP requirements.

Figure 3:
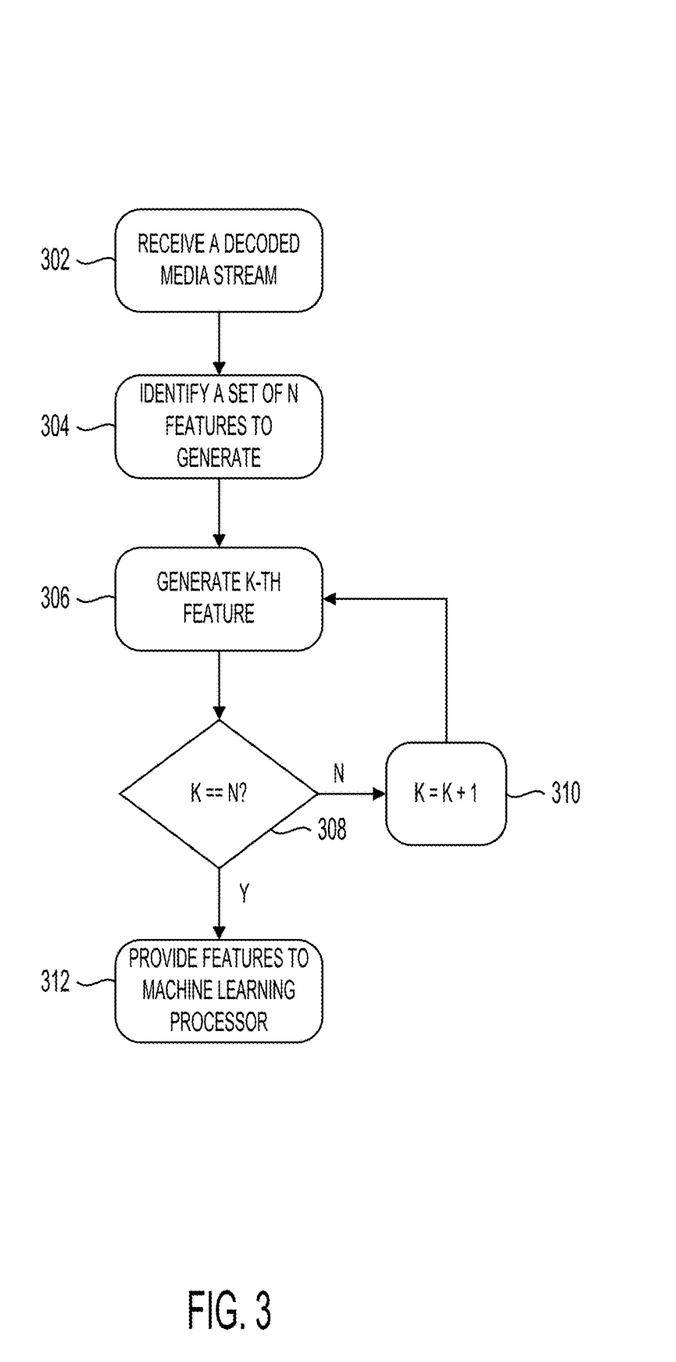
FIG. 3 illustrates an example flow diagram of a method for improving security of media streams, in accordance with one or more implementations.

Referring now to FIG. 3, depicted is an illustrative flow diagram of a method 300 for improving security of media streams. The method 300 can be executed, performed, or otherwise carried out by the feature extraction system 105, the computer system 400 described in connection with FIGS. 4A and 4B, or any other computing devices described herein. In brief overview, the method can feature extraction system can receive a decoded media stream, identify a set of n features to generate, generate the k-th feature, determine whether the counter k is equal to the number of features n, increment the counter k, and provide the features to a machine learning processor.

At step 302, the feature extraction system can receive a decoded media stream from a media decoding pipeline that receives and decodes an encoded media stream. The decoded media stream may include video data, audio data, metadata, or any combination thereof. The feature extraction system may receive the decoded content from a stream decoder (e.g., the stream decoder 110) via one or more suitable communications interfaces. The feature extraction system may include one or more buffers, or regions of memory, that store the decoded content for processing by other components of the feature extraction system. The buffers, which may store timestamped frames and audio data received from the stream decoder, may be accessible by other components of the feature extraction system, but are inaccessible to the machine learning processor 140, in compliance with SVP requirements. In some implementations, the feature extraction system may provide the decoded media content to a display (e.g., the display 145). The feature extraction system may store the received decoded content streams in association with various parameters and metadata that correspond to the decoded content stream (e.g., timestamp information, duration, resolution, bitrate, decoding rate, etc.). This information may be used by other components of the feature extraction system to perform one or more of the operations described herein. This information may also be used by the display to properly render or display the decoded media content.

At step 304, the feature extraction system can identify, based on the decoded media stream, a set of n features (e.g., the features 130) to generate. For example, the feature extraction system can identify the features 130 to generate based on the type of content in the decoded media stream. If the decoded media stream includes video content, the feature extraction system may identify features corresponding to video data that should be generated. Similarly, if the decoded media stream includes audio content, the feature extraction system can identify features corresponding to audio data that should be generated. The features to be generated may also be identified based on a configuration setting (e.g., in a configuration file or setting provided via an external computing system or configured by a user). The configuration setting may specify one or more features to generate for various types of media content. In some implementations, the feature extraction system may identify the specific media content in the decoded media content (e.g., the specific program, the specific channel, specific song, specific record etc.), and identify the features to generate (e.g., from the configuration) using the identifier of the media content. For example, some configurations may perform different operations for different media programs that have different attributes (e.g., motion vectors may be generated for sporting events, while color and audio analysis may be performed for dramatic television shows). Attributes of media content can include various parameters of the decoded media stream, including a name of the media stream, a type of the media stream (e.g., video, audio, etc.), and the subject matter of the media stream, among any other attributes of the media stream.

Stored or accessed configuration settings may specify various types of features that are to be extracted for certain media content. In some implementations, the feature extraction system may query, or transmit a request to, a machine learning processor (e.g., the machine learning processor 140), which may include the configuration settings for features to identify, including one or more formatting requirements for the media content once generated. The machine learning processor may include a program or another type of user-configurable setting that specifies one or more features to generate. The feature extraction system can query the machine learning processor for these features, and store the identifiers of the features to generate in the memory of the feature extraction system 105, for use by other components in performing the present techniques.

The feature extraction system may identify different features to generate from video content and audio content. For example, for video data, the feature extraction system may identify the types of features to generate as including one or more of a luma histogram, edge detection plots, object detection information (e.g., the presence of one or more objects in a video frame), object classification information (e.g., the classification of one or more objects in a video frame), spectral analysis information, motion vectors, as well as various parameters, such as minimum pixel value, maximum pixel value, or average pixel value. The parameters may also include parameters or properties of the video content, including resolution, bitrate, among other information. The features to generate for audio content may be identified as including, for example, gain information, frequency band histograms, other histograms for various parameters of the audio content, peak information (e.g., minimum, maximum, range values, etc.), tone information, pitch information, harmonic analysis information, a key of a song, or beats-per-minute in a song, among other audio features. The feature extraction system may enumerate the number of identified features n.

At step 306, the feature extraction system can generate the k-th features using the decoded media stream. In some implementations, the feature extraction system can generate the features by iterating through the list of features to generate identified by the feature extraction system according to the counter register k, and subsequently generating the k-th feature in the list. In some implementations, the feature extraction system can extract one or more features in parallel, rather than using sequential processes. To generate the features, the feature extraction system can execute one or more processing algorithms over the decoded media stream (e.g., over one or more of the buffers that store the decoded media content). For example, to generate one or more edge detection plots, the feature extraction system may apply an edge detection technique to one or more frames of the decoded media content. Some example edge detection techniques include, but are not limited to, Canny edge detection, Deriche edge detection, differential edge detection, Sobel edge detection, Prewitt edge detection, and Roberts cross edge detection, among others. In some implementations, the feature extraction system can pre-process (e.g., normalization, color adjustments, noise reduction, etc.) the decoded media content prior to performing the processing algorithms to generate the k-th feature. Other algorithms may also be executed to generate additional information. For example, object detection models (e.g., neural networks, etc.) may be executed over the frames of video content to detect the presence of one or more objects. In some implementations, a number of objects (which may be detected as having a particular class or type) may be detected in one or more frames of the video information using such object detection models.

Object detection models may be executed using the pixels of the frames as input, for example, in a feed-forward neural network or similar artificial intelligence model. Similarly, object classifications may be executed over frames (or portions of frames) to classify detected objects. Object classification models can include, for example, CNNs, fully connected neural networks, or other similar artificial intelligence models that can be used to generate classifications of objects. The feature extraction system may generate spectral analysis on frames of video information, for example, by applying one or more spectral analysis algorithms to the pixels of the frames. Performing spectral analysis on color channel values on pixels in frames of the video data can include performing a Fourier transform, or a fast Fourier transform, over one or more color channels of a frame. The resulting spectral image may indicate spectral information of the colors in the image, but may not include sufficient information that the frame itself may be reconstructed (e.g. knowing that the frame includes n pixels of a certain brightness and y pixels of another brightness would not allow one to reconstruct the source image without more information).

In addition, the feature extraction system may execute various algorithms over sequences of frames in video data, for example, to produce features of the media content that correspond to time. For example, the feature extraction system can generate the features to include motion vectors of various pixels or objects detected in media content, by performing one or more motion estimation algorithms over the pixels of sequences of frames of the decoded media content. Some examples of motion estimation algorithms include block-matching algorithms, phase correlation and frequency domain analysis algorithms, pixel recursive algorithms, and optical flow algorithms. In some implementations, the feature extraction system may generate motion vectors by performing corner detection on each frame in a sequence, and subsequently comparing locations of the corners over time (e.g., between frames) using statistics functions such as random sample consensus (RANSAC) to estimate motion vectors.

The features to generate for audio content may be identified as including, for example, gain information, frequency band histograms, other histograms for various parameters of the audio content, peak information (e.g., minimum, maximum, range values, etc.), tone information, pitch information, harmonic analysis information, a key of a song, or beats-per-minute in a song, among other audio features. The feature extraction system can also generate the features to include various color parameters of frames in the video stream. For example, the feature extraction system can determine a minimum or maximum pixel intensity value of a frame by comparing the color channel intensity values of each pixel in the frame to one another. Similarly, the feature extraction system can calculate an average pixel intensity value by summing the color intensity values of each pixel and dividing the sum by the total number of pixels. The feature extraction system can determine a median pixel intensity value by ranking the pixels by intensity value, and subsequently determining the median of the pixels according to the intensity. These operations may be performed for a single color channel, or for combinations of color channels. For example, the feature extraction system may generate a parameter for a maximum pixel intensity value for the "red" color channel, or for a combination of the "red" and "blue" color channels. These parameters may be stored as part of the features by the feature extraction system.

The feature extraction system can also generate features for audio content in a content stream (e.g., an audio channel that is synchronized to video content, or one or more audio channels for stereo or surround sound, etc.). Some example features that may be generated from audio data can include, for example, gain information, tone information, pitch information, beat information (e.g., using one or more beat detection algorithms), frequency band histograms (e.g., calculated by performing a Fourier transform or an FFT algorithm over the audio signal, volume information, peak information (e.g., minimum audio signal value, maximum audio signal value, peak-to-peak difference, etc.), pitch information (e.g., by performing one or more pitch detection algorithms), a key of an audio sample (e.g., using a key finding algorithm), or the beats-per-minute of an audio sample (e.g., using a beat detection algorithm). The feature extraction system may generate the features to conform to a format corresponding to the machine learning processor 140. As described herein above, the feature identifier 120 may query the machine learning processor 140, or another configuration setting, to identify the format in which the features should be generated. The feature extraction system can receive this formatting information, which may specify the structure and content of the data structures that make up the features, and generate the features using the techniques described herein to conform to the appropriate structure. In this way, the feature extraction system can generate the features to be compatible with a variety of customizable machine learning models or processes. The feature extraction system may store the generated features in the appropriate data structures in the memory of the feature extraction system 105.

At step 308, the feature extraction system can determine whether the counter k is equal to the number of features n.

To determine whether each of the n features has been generated, the feature extraction system can compare the counter register k used to track the number of generated features to the total number of features to generate n. If the counter register k is not equal to (e.g., less than) the number n, the feature extraction system can execute step 310, to increment the counter register k and continue to generate features. If the counter register k is equal to (e.g., equal to or greater than) the total number of labels in the subset n, the feature extraction system can execute step 312 to provide the generated features to a machine learning processor.

At step 310, the feature extraction system can increment the counter k. To track the total number of features that have been generated from the decoded media content, the feature extraction system can add one to the counter register k to identify the next feature in the set of features to generate. After incrementing the value of the counter register k, the feature extraction system can execute step 306 to generate the next feature in the set of features.

At step 312, the feature extraction system can provide the set of features to a processor executing a machine-learning model. The processor executing the machine-learning model may be prevented from accessing the decoded media stream. To do so, the feature extraction system may communicate the one or more features to the machine learning processor as they are generated, or in a batch process once a predetermined amount of features are generated. The feature extraction system may communicate the features to the machine learning processor via a suitable communications interface. In some implementations, the feature extraction system can communicate the features to the machine learning processor by storing the set of features in a region of memory that is accessible by the machine learning processor. For example, the machine learning processor may include one or more memory components. To provide the features to the machine learning processor, the feature extraction system can write the features to the memory of the machine learning processor, which can subsequently use the features when executing a machine learning model.

Accordingly, implementations of the systems and methods discussed herein can allow for further analysis of video data by machine learning systems, without exposing any of the media data itself to the machine learning systems. This enhances the security of the media content, and improves compliance with SVP requirements and copyright protections. Further, by integrating a feature extraction system into the media processing pipeline, the systems and methods described herein extend the functionality of conventional set-top box or media processing systems, by enabling the integration of configurable processor to the media processing pipeline. Accordingly, the systems and methods described herein provide improvements over conventional media processing techniques.

Figure 4A:
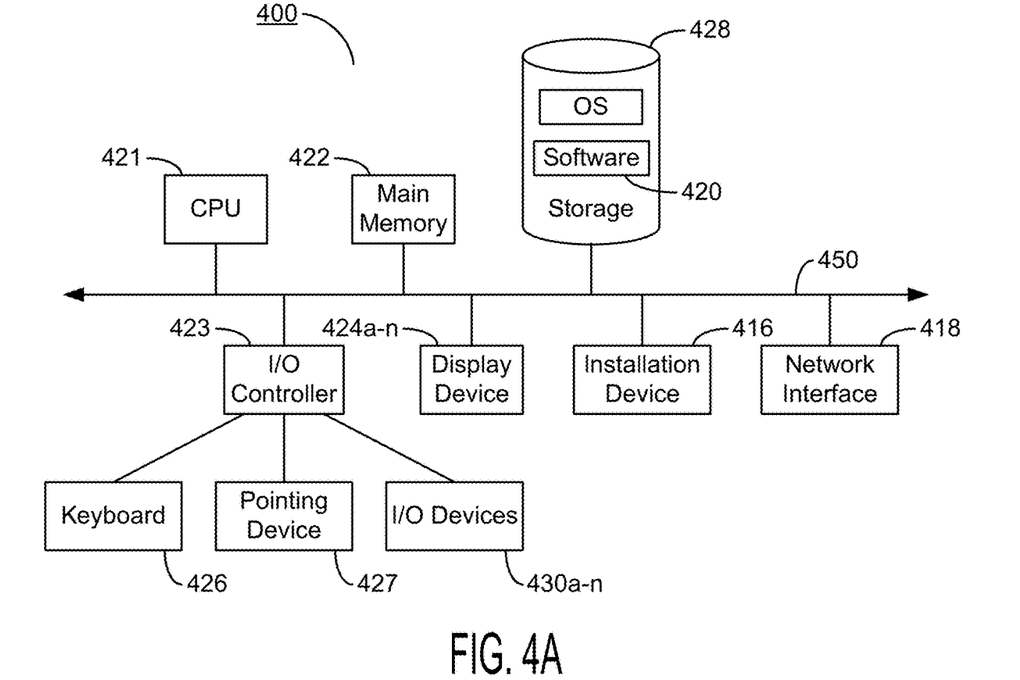
FIGS. 4A and 4B illustrate block diagrams depicting implementations of computing devices useful in connection with the methods and systems described herein.
Figure 4B:
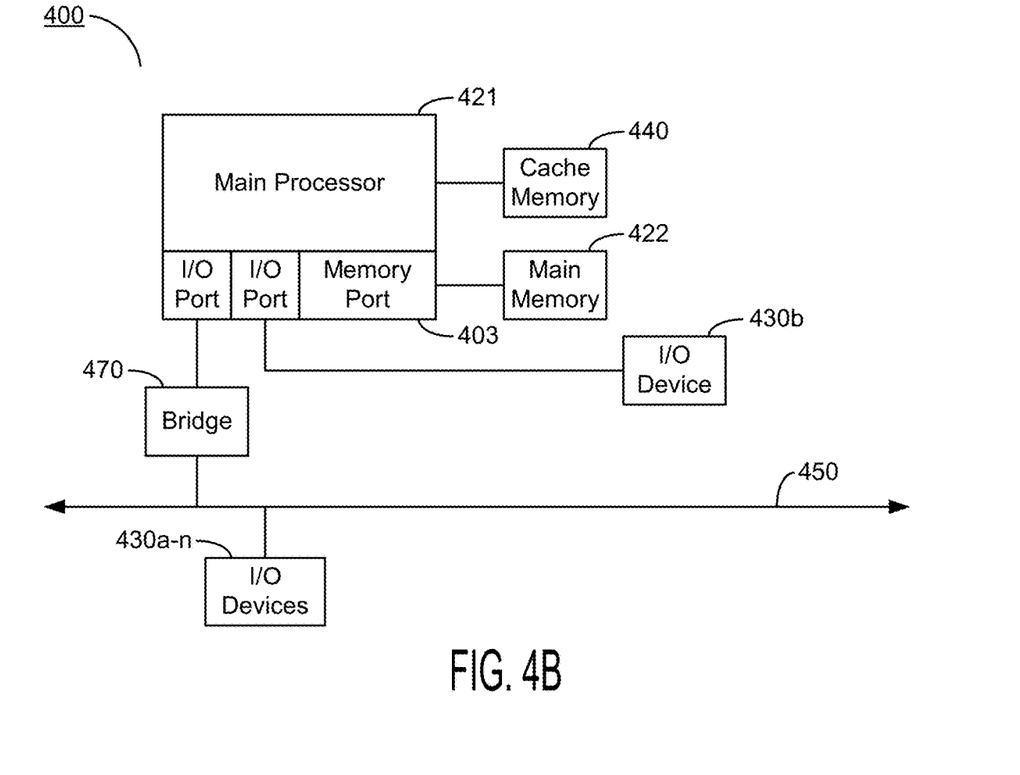

FIGS. 4A and 4B depict block diagrams of a computing device 400 useful for practicing implementations of the computing devices described herein. As shown in FIGS. 4A and 4B, each computing device 400 includes a central processing unit 421, and a main memory unit 422. As shown in FIG. 4A, a computing device 400 may include a storage device 428, an installation device 416, a network interface 418, an I/O controller 423, display devices 424a-824n, a keyboard 426 and a pointing device 427, such as a mouse. The storage device 428 may include, without limitation, an operating system and/or software. As shown in FIG. 4B, each computing device 400 may also include additional optional elements, such as a memory port 403, a bridge 470, one or more input/output devices 430a-830n (generally referred to using reference numeral 430), and a cache memory 440 in communication with the central processing unit 421.

The central processing unit 421 is any logic circuitry that responds to and processes instructions fetched from the main memory unit 422. In many implementations, the central processing unit 421 is provided by a microprocessor unit, such as: those manufactured by Intel Corporation of Mountain View, California; those manufactured by International Business Machines of White Plains, New York; those manufactured by Advanced Micro Devices of Sunnyvale, California; or those manufactured by Advanced RISC Machines (ARM). The computing device 400 may be based on any of these processors, or any other processors capable of operating as described herein.

Main memory unit 422 may be one or more memory chips capable of storing data and allowing any storage location to be directly accessed by the microprocessor 421, such as any type or variant of Static random access memory (SRAM), Dynamic random access memory (DRAM), Ferroelectric RAM (FRAM), NAND Flash, NOR Flash and Solid State Drives (SSD). The main memory 422 may be based on any of the above described memory chips, or any other available memory chips capable of operating as described herein. In the implementation shown in FIG. 4A, the processor 421 communicates with main memory 422 via a system bus 450 (described in more detail below). FIG. 4B depicts an implementation of a computing device 400 in which the processor communicates directly with main memory 422 via a memory port 403. For example, in FIG. 4B the main memory 422 may be DRDRAM.

FIG. 4B depicts an implementation in which the main processor 421 communicates directly with cache memory 440 via a secondary bus, sometimes referred to as a backside bus. In other implementations, the main processor 421 communicates with cache memory 440 using the system bus 450. Cache memory 440 typically has a faster response time than main memory 422 and is provided by, for example, SRAM, BSRAM, or EDRAM. In the implementation shown in FIG. 4B, the processor 421 communicates with various I/O devices 430 via a local system bus 450. Various buses may be used to connect the central processing unit 421 to any of the I/O devices 430, for example, a VESA VL bus, an ISA bus, an EISA bus, a MicroChannel Architecture (MCA) bus, a PCI bus, a PCI-X bus, a PCI-Express bus, or a NuBus. For implementations in which the I/O device is a video display 424, the processor 421 may use an Advanced Graphics Port (AGP) to communicate with the display 424. FIG. 4B depicts an implementation of a computer 400 in which the main processor 421 may communicate directly with I/O device 430b, for example via HYPERTRANSPORT, RAPIDIO, or INFINIBAND communications technology. FIG. 4B also depicts an implementation in which local busses and direct communication are mixed: the processor 421 communicates with I/O device 430a using a local interconnect bus while communicating with I/O device 430b directly.

A wide variety of I/O devices 430a-830n may be present in the computing device 400. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 423 as shown in FIG. 4A. The I/O controller may control one or more I/O devices such as a keyboard 426 and a pointing device 427, e.g., a mouse or optical pen. Furthermore, an I/O device may also provide storage and/or an installation medium 416 for the computing device 400. In still other implementations, the computing device 400 may provide USB connections (not shown) to receive handheld USB storage devices such as the USB Flash Drive line of devices manufactured by Twintech Industry, Inc. of Los Alamitos, California.

Referring again to FIG. 4A, the computing device 400 may support any suitable installation device 416, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 400 may further include a storage device, such as one or more hard disk drives or redundant arrays of independent disks, for storing an operating system and other related software, and for storing application software programs such as any program or software 420 for implementing (e.g., configured and/or designed for) the systems and methods described herein. Optionally, any of the installation devices 416 could also be used as the storage device. Additionally, the operating system and the software can be run from a bootable medium.

Furthermore, the computing device 400 may include a network interface 418 to interface to the network 404 through a variety of connections including, but not limited to, standard telephone lines, LAN or WAN links (e.g., 402.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 402.11, IEEE 402.11a, IEEE 402.11b, IEEE 402.11g, IEEE 402.11n, IEEE 402.11ac, IEEE 402.11ad, CDMA, GSM, WiMax and direct asynchronous connections). In one implementation, the computing device 400 communicates with other computing devices 400' via any type and/or form of gateway or tunneling protocol such as Secure Socket Layer (SSL) or Transport Layer Security (TLS). The network interface 418 may include a built-in network adapter, network interface card, PCMCIA network card, card bus network adapter, wireless network adapter, USB network adapter, modem or any other device suitable for interfacing the computing device 400 to any type of network capable of communication and performing the operations described herein.

In some implementations, the computing device 400 may include or be connected to one or more display devices 424a-824n. As such, any of the I/O devices 430a-830n and/or the I/O controller 423 may include any type and/or form of suitable hardware, software, or combination of hardware and software to support, enable or provide for the connection and use of the display device(s) 424a-824n by the computing device 400. For example, the computing device 400 may include any type and/or form of video adapter, video card, driver, and/or library to interface, communicate, connect or otherwise use the display device(s) 424a-824n. In one implementation, a video adapter may include multiple connectors to interface to the display device(s) 424a-824n. In other implementations, the computing device 400 may include multiple video adapters, with each video adapter connected to the display device(s) 424a-824n. In some implementations, any portion of the operating system of the computing device 400 may be configured for using multiple displays 424a-824n. One ordinarily skilled in the art will recognize and appreciate the various ways and implementations that a computing device 400 may be configured to have one or more display devices 424a-824n.

In further implementations, an I/O device 430 may be a bridge between the system bus 450 and an external communication bus, such as a USB bus, an Apple Desktop Bus, an RS-232 serial connection, a SCSI bus, a FireWire bus, a FireWire 400 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to view videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device.

The operations described in this specification can be implemented as operations performed by a data processing apparatus on data stored on one or more computer-readable storage devices or received from other sources.

The terms "data processing apparatus", "feature extraction system," "data processing system", "client device", "computing platform", "computing device", or "device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the feature extraction system 105 can include clients and servers. For example, the feature extraction system 105 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the feature extraction system 105 could be a single module, or a logic device having one or more processing modules.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for improving security of media streams, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A method of improving security of media streams, comprising:
    receiving, by one or more processors of a device, a decoded media stream from a media decoding pipeline that receives and decodes an encoded media stream;
    identifying, by the one or more processors, based on the decoded media stream, a set of features to generate;
    generating, by the one or more processors, the set of features using the decoded media
    stream, the one or more processors storing the set of features in a first region of memory accessible by a processor executing a machine-learning model while storing the decoded media stream in a second region of memory for which the processor executing the machine-learning model is prevented from accessing; and
    providing, by the one or more processors using the first region of memory, the set of features to the processor executing the machine-learning model, wherein the processor executing the machine-learning model is prevented from accessing the second region of memory storing the decoded media stream by the device.

2. The method of claim 1, wherein the decoded media stream comprises video data, and wherein the set of features comprises a luma histogram of the video data.

3. The method of claim 1, wherein identifying the set of features further comprises:
    determining, by the one or more processors, a type of media in the decoded media stream; and identifying, by the one or more processors, the set of features based on the type of media in the decoded media stream.

4. The method of claim 1, wherein identifying the set of features further comprises:
    extracting, by the one or more processors, raw video data from the decoded media stream; and
    identifying, by the one or more processors, the set of features based on attributes of the raw video data.

5. The method of claim 1, wherein the set of features is generated such that the processor executing the machine-learning model is unable to reconstruct the decoded media stream.

6. The method of claim 1, wherein generating the set of features further comprises applying, by the one or more processors, an edge detection technique or a spectral analysis technique to the decoded media stream.

7. The method of claim 1, wherein generating the set of features further comprises determining, by the one or more processors, based on one or more color channels of the decoded media stream, one or more of a minimum pixel intensity value, a maximum pixel intensity value, an average pixel intensity value, or a median pixel intensity value.

8. The method of claim 1, wherein generating the set of features further comprises detecting, by the one or more processors, a motion vector in the decoded media stream.

9. The method of claim 1, wherein the processor of the machine-learning model lacks one of permission or hardware connection to access the second region of memory.

10. The method of claim 1, further comprising generating, by the one or more processors, an
output media stream including a graphic generated based on an output of the machine learning processor and the decoded media stream; and
providing, by the one or more processors, the output media stream for presentation at a display.

11. A system for improving security of media streams, comprising:
one or more processors of a device, the one or more processors configured to:
receive a decoded media stream from a media decoding pipeline that receives and decodes an encoded media stream;
identify, based on the decoded media stream, a set of features to generate;
generate the set of features using the decoded media stream;
store the set of features in a first region of memory accessible by a processor executing a machine-learning model while storing the decoded media stream in a second region of memory for which the processor executing the machine-learning model is prevented from accessing; and
provide via the first region of memory the set of features to the processor executing a machine-learning model,
wherein the processor executing the machine-learning model is prevented from accessing the second region of memory storing the decoded media stream by the device.

12. The system of claim 11, wherein the decoded media stream comprises video data, and wherein the set of features comprises a luma histogram of the video data.

13. The system of claim 11, wherein to identify the set of features, the one or more processors are further configured to:
determine a type of media in the decoded media stream; and
identify the set of features based on the type of media in the decoded media stream.

14. The system of claim 11, wherein to identify the set of features, the one or more processors are further configured to:
extract raw video data from the decoded media stream; and
identify the set of features based on attributes of the raw video data.

15. The system of claim 11, wherein the set of features is generated such that the processor executing the machine-learning model is unable to reconstruct the decoded media stream.

16. The system of claim 11, wherein to generate the set of features, the one or more processors are further configured to apply an edge detection technique or a spectral analysis technique to the decoded media stream.

17. The system of claim 11, wherein to generate the set of features, the one or more processors are further configured to determine, based on one or more color channels of the decoded media stream, one or more of a minimum pixel intensity value, a maximum pixel intensity value, an average pixel intensity value, or a median pixel intensity value.

18. The system of claim 11, wherein the processor of the machine-learning model lacks one of permission or hardware connection to access the second region of memory.

19. A circuit for improving the security of media streams, comprising:
a bitstream decoder that receives an encoded bitstream and generates a decoded media stream; and
a processing component that receives the decoded media stream from the bitstream decoder, the processing component configured to:
identify, based on the decoded media stream, a set of features to generate;
generate the set of features using the decoded media stream;
store the set of features in a first region of memory accessible by a processor executing a machine-learning model while storing the decoded media stream in a second region of memory for which the processor executing the machine-learning model is prevented from accessing; and
provide the set of features to a second processor executing a machine-learning model, wherein the second processor executing the machine-learning model is prevented from accessing the second region of memory storing the decoded media stream.

20. The circuit of claim 19, wherein the second processor of the machine-learning model lacks one of permission or hardware connection to access the second region of memory.

* * * * *